Figure 1:
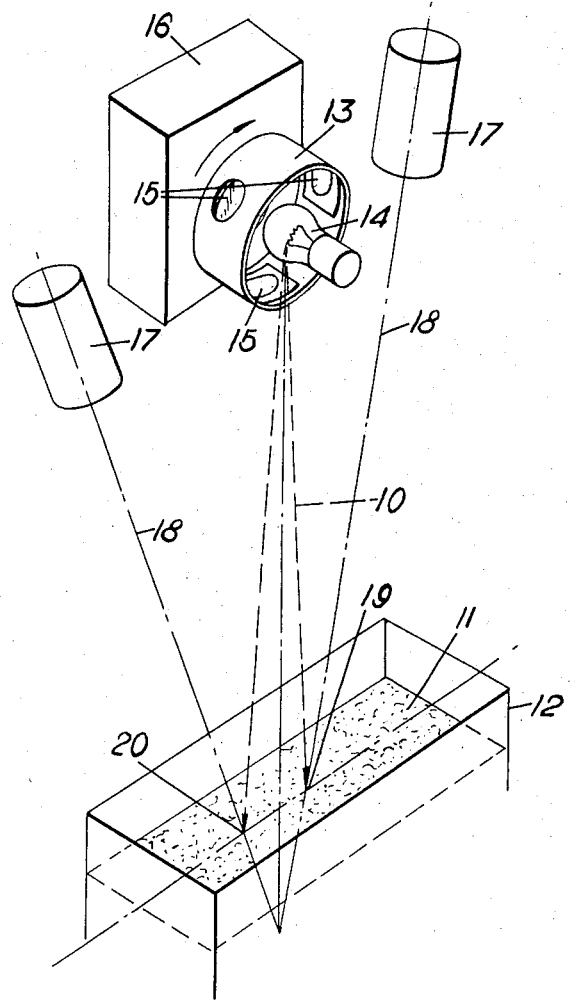

United States Patent [19]
Mansfield

[11] 3,821,558
[45] June 28, 1974

[54] DETERMINATION OR MONITORING OF THE DISTANCES OF SURFACES FROM REFERENCE POSITIONS

[75] Inventor: John William Brian Mansfield, London, England

[73] Assignee: Fleet Electronics Limited, London, England

[22] Filed: Aug. 9, 1972

[21] Appl. No.: 279,233

[52] U.S. Cl............. 250/577, 73/290 R, 235/92 V, 356/156, 356/167
[51] Int. Cl.. G01f 23/28, G01b 11/22, G01n 21/26
[58] Field of Search......... 73/290 R, 293; 235/92 V, 235/92 M, 92 T, 151.3; 250/218, 222 R, 236, 577; 356/156, 159, 160, 167, 170

[56] References Cited
UNITED STATES PATENTS
3,272,174  9/1966  Pribonic............................ 73/293 X Primary Examiner—Richard C. Queisser
Assistant Examiner—Frederick Shoon
Attorney, Agent, or Firm—Rose & Edell

[57] ABSTRACT

In an apparatus for monitoring the height to which material has been filled into commodity packages, the level of the top surface of the material in each package is determined, without physical contact between the apparatus and the material, by traversing a light beam across said top surface and generating a signal when the spot of light on said top surface intersects the viewing beam or beams of one or more photoelectric detector cells. The light beam and the viewing beam lie in a common plane but have different angular directions, at least at the instant of intersection. The point in the light beam traverse cycle at which intersection with the viewing beam takes place therefore varies in time according to the level of the top surface of the material in the package and so gives a measure of that level.

10 Claims, 4 Drawing Figures

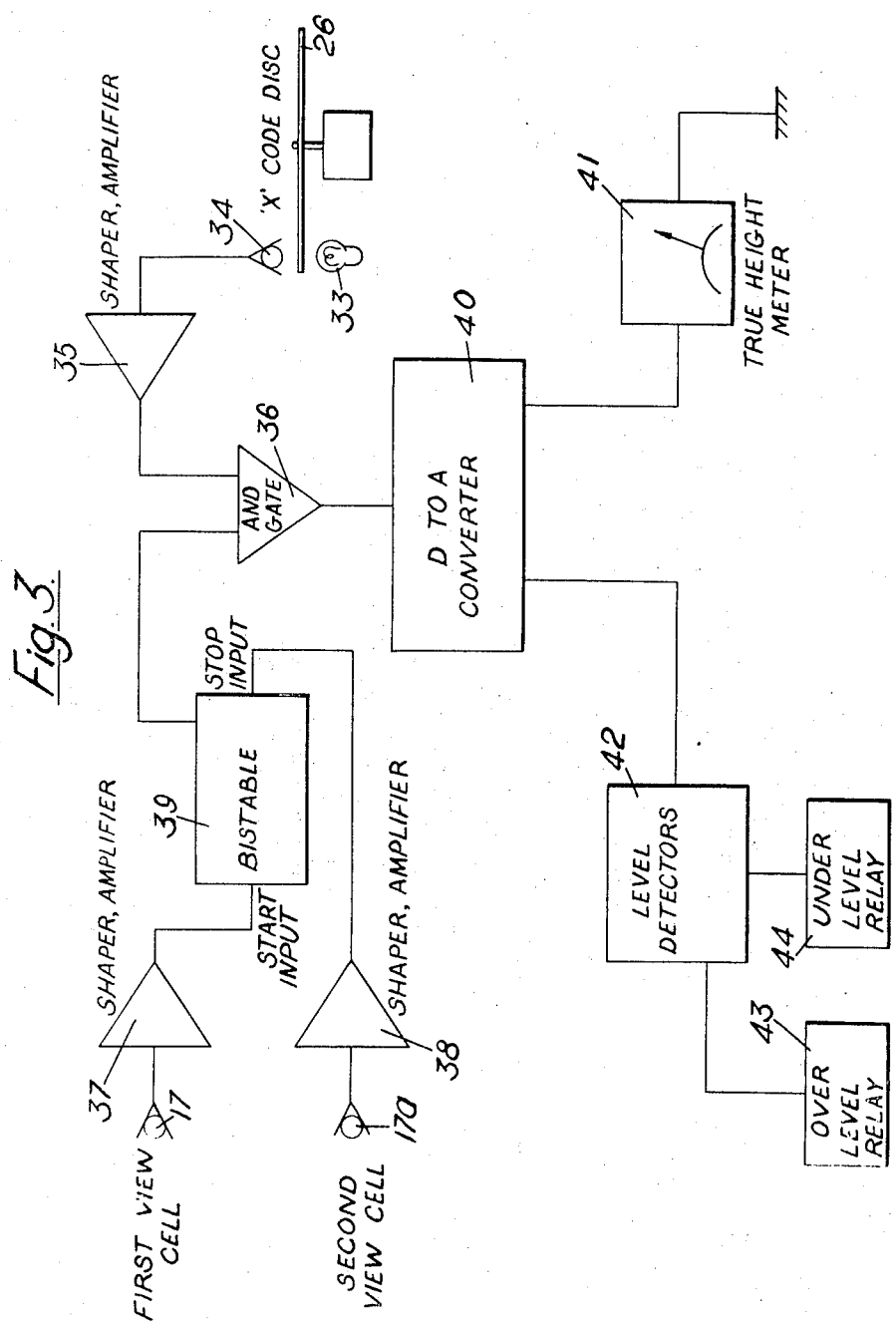

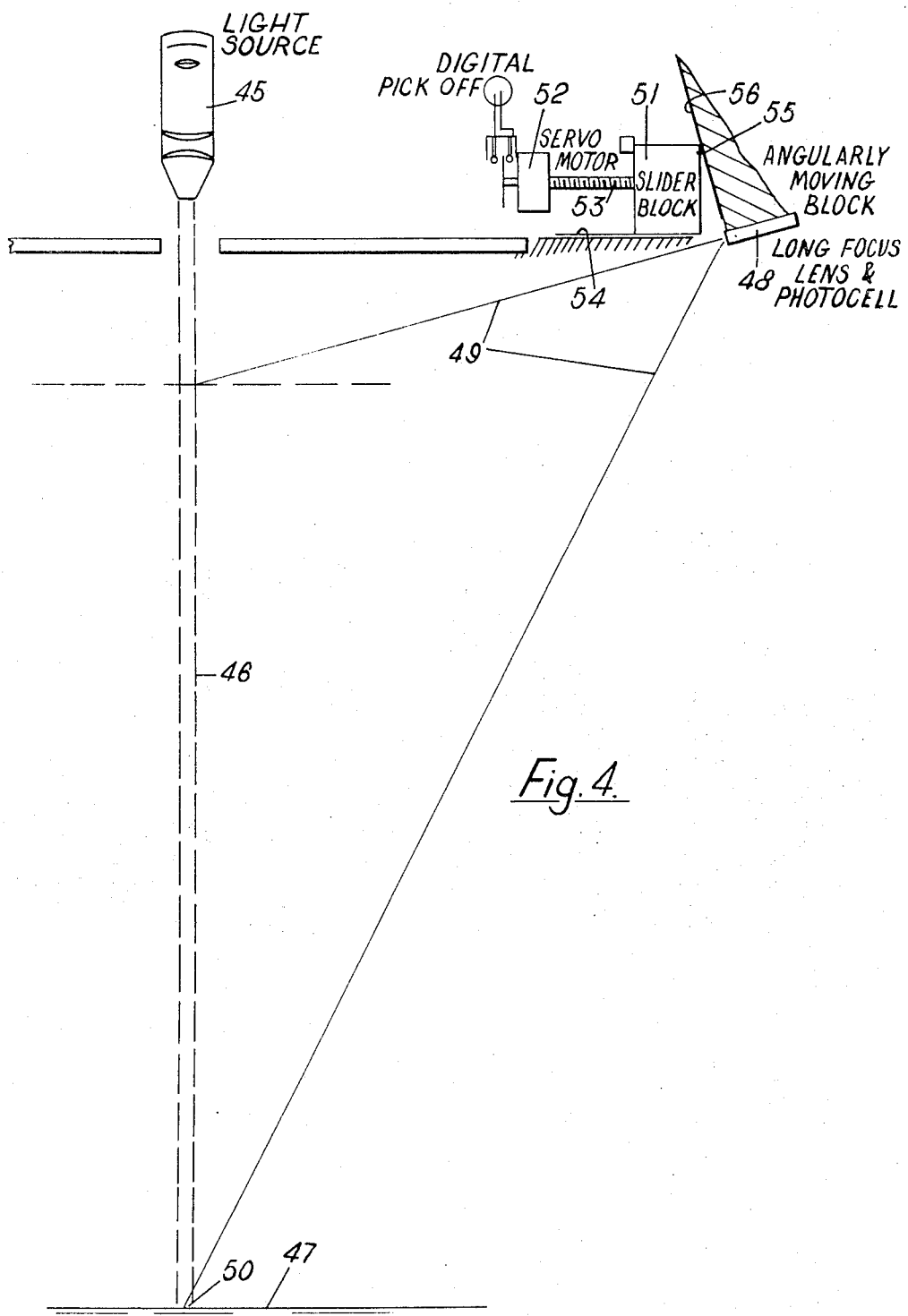

DETERMINATION OR MONITORING OF THE DISTANCES OF SURFACES FROM REFERENCE POSITIONS

This invention is concerned with determination or monitoring of the distance of a surface, or each of a succession of surfaces, from a reference position. A specific instance is the monitoring of the extent to which commodity packages or containers have been filled by checking the height of the surface level of the contents of each container. Another instance is the measurement of the level or depth of the contents of a tank or silo. The technique of the invention is, however, not restricted to these particular uses but it will be apparent that it may be employed in a wide variety of practical applications.

According to the present invention, there is provided apparatus for determining the distance of a surface, or each of a succession of surfaces, from a reference position, e.g. to monitor the surface level of liquid or other fluent material in a container or a succession of containers, comprising a light source and means to project at least one beam of light therefrom on to the surface, or each surface in turn, thereby to create at least periodically a sensible spot on the surface, or each surface in turn, where the light beam impinges, at least one photoelectric detector device arranged to 'view' along a defined viewing beam the axis of which passes at least periodically through said sensible spot so that the detector then senses the presence of said sensible spot, the light beam and the viewing beam being substantially in the same plane but having different angular directions in said plane when they are in the particular condition of intersection at said sensible spot, and means causing either said light beam or said viewing beam to sweep substantially in said plane, the arrangement being such that the sweeping beam reaches said particular condition of intersection at a point in the sweep traverse that varies according to the distance of the surface, or each surface, from said reference position.

If, for example, the scanning equipment is disposed at a fixed position above a container or tank and is arranged to measure the distance of the surface of the tank contents below it, then this is equivalent to a measurement of the level or depth of the tank contents.

The term 'spot' is intended to include a small area or point and also a narrow line at right angles to the plane of sweep.

In one form, the surface, or each surface in turn, is scanned repeatedly by the light beam sweeping at a substantially uniform rate, and two photocells observe the scanned surface along mutually convergent (or divergent) viewing axes lying in the afore-said plane. Due to the convergence (or divergence) of the viewing axes, the path length between the points at which they respectively intersect the surface of interest will change according to the distance of that surface from the scanning equipment, and thus the time interval between the instants at which the two photocells see the passage of the scanning beam across the surface will likewise change. This time interval therefore gives a measure of the distance of the surface from the equipment.

In another form, a narrow light beam is directed from above a tank or silo vertically down on to the surface of the contents of the tank. A photocell also mounted above the tank, but spaced horizontally from the light source, is turned angularly in a plane containing the light beam and its viewing axis intersects the light beam axis. The viewing axis of the photocell therefore scans the length of the light beam as the photocell turns and a signal indication is obtained from the photocell at the instant when its viewing axis is aligned with the spot where the light beam strikes the surface of the tank contents. The instantaneous angle of the photocell axis is then a non-linear function of the depth of the contents of the tank or silo.

In the preferred arrangement, however, an output signal is obtained which is a direct linear function of the depth of the tank contents by means of a small slider that travels rectilinearly along an accurate guide surface while maintaining contact at one corner with a second accurately ground surface that moves angularly in unison with the photocell.

Figure 2:
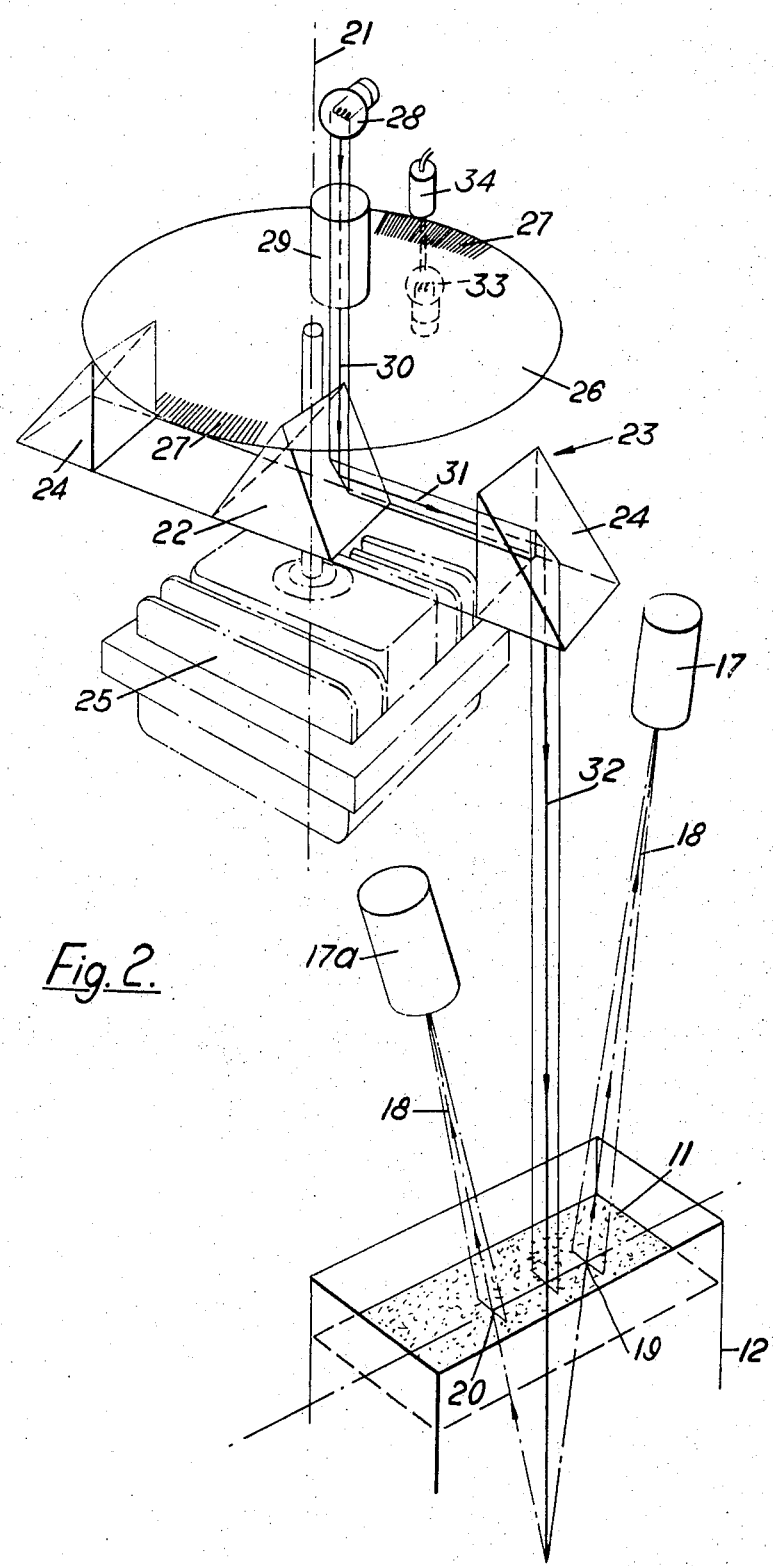

Apparatus in accordance with the above general principles will now be described in more detail, by way of example, with reference to the accompanying drawings, in which:

FIG. 1 is a pictorial diagram of one form of apparatus in accordance with the invention, FIG. 2 is a pictorial diagram of a second form of apparatus, FIG. 3 is a block diagram of circuitry for use with the apparatus of FIG. 2, and FIG. 4 illustrates in diagrammatic elevation a third form of apparatus.

The first apparatus to be described is primarily intended for monitoring the level of the contents of a succession of open-topped packages passing beneath, with the object of rejecting any which are under- or over-filled. At the monitoring station, a light beam 10 in the form of a narrow band or line is caused to traverse the surface of the contents 11 of a package 12 cyclically. This light beam is projected by means of a rotating drum 13 directly above the package which drum has a fixed tungsten lamp 14 preferably with a long straight filament disposed coaxially within it as a light source, three lenses 15 being mounted equiangularly around the drum periphery so that the light beam sweeps across the package below three times for each revolution of the drum. However, the arrangement is not restricted to three lenses but any desired number may be employed. The drum is driven at a constant speed by a synchronous electric motor 16. On either side of the drum 13 are mounted a pair of stationary photocells 17 with their viewing axes 18 converging downwardly and lying in a vertical plane parallel with the direction of scan. That is to say, the axis of rotation of the drum is perpendicular to the plane containing the photocell axes.

The distance between the points 19,20 where the two cell viewing axes 18 intersect the surface plane of the contents 11 of the package 12 will, due to the convergence of these axes, depend on the distance or range of that plane below the monitoring equipment and hence on the level or depth to which the package is filled. Thus, the time taken for the light beam to traverse across the package contents surface from the point 19 where it is sensed by one photocell 17 to the point 20 where it is sensed by the other will vary with the package contents. The photocells 17 therefore give two signals, spaced by a short time interval, which can be employed to trigger an alarm, or a rejection mechanism, if a package is over- or under-filled as denoted by the time interval being too long or too short.

The photocells 17 may be photo transistors and one way of processing the signals derived from them is as follows. The signals are delivered to independent channels where they are amplified and pulse-shaped. They are then employed, respectively, to set and reset a bistable circuit. The output of the bistable circuit is applied to a transistor switch and during the short time interval that the bistable circuit is set the switch serves to discharge a capacitor which is otherwise maintained at a constant level of charge. The charge condition of this capacitor at the instant when the bistable circuit is reset by the second photocell signal is therefore a measure of the time interval between the two photocell signals. This charge level is communicated to a short term store comprising appropriate capacitor-diode circuitry and an output field effect transistor. A further switch transistor is responsive to the bistable circuit and serves to reset the store before the commencement of each cycle so that the information in the store is repeatedly updated cycle by cycle.

The signal output of the field effect transistor is compared with a pair of reference signals, representing preset upper and lower limits, and if it is outside those limits an alarm relay is energized. However, the alarm signal is gated by photocell circuitry which detects the presence or absence of a package at the monitoring station thereby to avoid spurious alarms.

The scheme of FIG. 1 has the advantage that it can readily be adapted for giving a plurality of readings across a given surface area, i.e. it is easy to multiplex the rotary drum. FIG. 2 illustrates a scheme which lacks this facility of ready adaption for the taking of multiple readings but which is, nevertheless, more versatile in other respects.

In FIG. 2, the beam scan is derived from an optical assembly 23 rotating about a vertical axis 21, the photocells 17, 17a being disposed with their axes 18 in a vertical plane off-set horizontally from the axis 21 which axis is parallel to the line bisecting the angle between the photocell axes. The rotating optical assembly comprises a central reflecting optical element, which in this case is a double-sided roof mirror 22 lying with its apex upward, and one or more further reflecting elements, in this case two right angle prisms 24 (which could also be mirrors if desired) spaced horizontally from the roof mirror at equal distances on opposite sides thereof and rotating around it in planetary fashion, the assembly being driven by a synchronous electric motor 25. The rotating assembly also includes a horizontal transparent disc 26 bearing two diametrically-opposed sets of code markings or indicia 27 and with its centre coincident with the vertical axis of rotation. The light source is a fixed lamp 28 disposed above the roof mirror 22 and having a lens 29 for imaging its filament along a downward vertical optical path 30.

Thus, the rotary optical assembly rotates about an axis parallel to the path of the beam from the light source, as well as substantially parallel to the line bisecting the angle between the axes of the photocells, the central reflecting optical element of the rotary assembly reflects the beam into a path substantially parallel to the plane of rotation, and each planetary optical element serves to reflect the beam again into a path substantially parallel to the axis of rotation which path sweeps angularly about said axis.

The arrangement is such that each prism 24 sweeps in turn over the surface of the contents 11 of the package 12 and during this portion of its rotary travel the prism is moving in a horizontal path roughly parallel to the vertical plane of the photocell axes 18. Also at this period of the rotation the vertical beam 30 from the light source 28 impinges on the face of the roof mirror 22 that is nearer the prism 24 over the package 12 so that the beam is reflected first horizontally, at 31, toward the prism 24 and then vertically downward by the prism, at 32, on to the surface of the package contents, the place of impingement of the beam 32 on this surface traversing between the two spaced points 19, 20 at which the viewing axes 18 of the photocells 17, 17a intersect the surface. Use of two prisms 24 and a double-sided mirror 22 causes this beam traverse to occur twice during each cycle of rotation. The filament image of the lamp 28 does not, of course, turn during beam traverse because the lamp itself does not rotate even although the optical assembly 23 is rotary.

The two sets of code marks or indicia 27 on the disc 26 appertain, respectively, to the traverse of the two prisms 24 and are read by a small stationary lamp 33 and photocell 34. If only one prism were employed only one set of indicia would be required. The indicia are in the form of opaque radial lines on the transparent disc 26 and the photocell 34 is contained in a housing with a slit aperture parallel to the indicia lines as they pass between the lamp and photocell. The passage of the lines is therefore read as a succession of equal time pulses. To obtain a measure of the distance between the points 19 and 20, and therefore of the height of the contents in the package 12, the first main photocell 17 is employed to open a gate for the pulse train delivered by the code reader photocell 34 and the pulses are then counted until the gate is subsequently closed by the second main photocell 17a.

FIG. 3 shows the circuitry employed. The pulse train from the code reader photocell 34 is delivered via an amplifier and shaping circuit 35 to an 'AND' gate 36. The output pulses from the first and second main photocells 17, 17a are applied, via respective amplifier and shaping circuits 37, 38, to set and reset inputs of a bistable circuit 39. The output of the bistable circuit 39 is delivered to a second input of the gate 36, whereby the gate is enabled to pass the pulse train from the code reader photocell 34 only during those periods after the bistable 39 has been set by a pulse from the first main photocell 17 and before it has been reset by a pulse from the second main photocell 17a. The output pulses from the gate 36 are applied to a digital-to-analogue converter 40 which converts each discrete train of pulses into an analogue representative of the pulse count. This analogue signal is therefore a measure of the height or depth of the package contents 11 and can be applied to a true height meter 41 for direct visual read out. Also, conventional level detecting circuitry 42 comparing the output signal level of the converter 40 with maximum and minimum preselected reference levels can be employed to excite one or other of alarm relays 43, 44 if the height reading passes outside the limits prescribed by the preselected levels.

It will be understood that the circuitry shown in block form in FIG. 3 is simplified to illustrate merely the principle involved. Ordinarily, there will be a fourth photocell (not shown) to detect when a package is present, and an associated gating circuit to ensure that spurious readings are not taken in the absence of a package.

Apparatus of this kind can control the levels of contents in packages, on a stop/go basis, to an accuracy of one-sixteenth of an inch or better. Each division of the indicia 27 on the disc 26 may conveniently represent one-twentieth of an inch in height. Height, as such, can be measured to within one-twentieth of an inch or better. A convenient speed of rotation of the device is found to be 1400 r.p.m. giving 2800 measurements per minute, but considerably faster operation can be achieved, if desired.

A variety of lenses 29 for imaging the filament of the main light source 28 are interchangeable, the chosen power of the lens depending on the fineness or coarseness of the surface to be measured. With a fine particle surface a small impinging beam spot can be employed, but with a coarse particle surface too small a spot may read the depth of hollows or valleys between individual particles which are not representative of the surface level as a whole. Discs 26 with different spacings of the indicia to suit different particulate surfaces are likewise interchangeable.

It will be evident that the arrangements described can be adapted for many other purposes. One example is monitoring the thickness of a continuously produced web or band of material, a signal representing a measure of the actual level or depth being available, if required, as already seen in connection with FIG. 3.

There are various other ways in which a cyclical traverse of the light beam across the surface of interest can be achieved. A single rotating plane mirror can be employed; or a mirror which is oscillated electromagnetically. The latter possibility is most useful in cases where the view of the surface of interest is restricted, as with monitoring the contents of containers with reduced necks.

A particular advantage of the arrangements described is that if the surface of the package or container contents is not truly level, the equipment tends to indicate the average or mean level instead of giving a possibly grossly inaccurate indication.

Turning now to the measurement of level in large, deep tanks or silos, FIG. 4 of the accompanying drawings shows one particular apparatus. A light source 45 mounted at the top of the silo projects a narrow light beam 46 vertically downward on to the surface 47 of the silo contents. This light source could be a laser but in many applications that will not be necessary. A photocell 48 also mounted at the top of the silo, and spaced horizontally from the light source, has its viewing axis 49 disposed in a vertical plane containing the axis of the light beam so as to intersect it. The photocell is moved angularly in the plane of the light beam 46 and viewing axis 49 whereby the point of intersection travels down the light beam until it passes through the spot 50 where the beam strikes the surface 47. At that instant the photocell signals that it can "see" this spot.

To obtain a direct linear read-out of the level of the silo contents a carriage or slider 51 is moved rectilinearly by a servo motor 52 and lead screw 53 along an accurately ground guide surface 54 while maintaining point contact at one hardened corner 55 with a second accurately ground surface 56 that moves angularly in unison with the photocell 48. It will be seen that the geometry of this mechanical arrangement is such that the position of the slider 51 is directly proportional to the distance along the beam 46 of the intersection point of the viewing axis 49, so that a direct digital read-out can be picked-off from the slider.

In a deep silo, the photocell will need to be equipped with an optical system comprising a long focus lens.

Although the foregoing description deals only with height or depth measurement, it will be understood that apparatus according to the invention is not restricted to working in the vertical mode but will function also in other orientations for other measurement applications.

I claim:

1. Apparatus to monitor the top surface level of fluent material in a container, comprising a light source and projection means to project at least one beam of light therefrom downwardly on to the horizontal surface of said fluent material thereby to create at least periodically a sensible spot on said surface where the light beam impinges, and two photocells mounted to view said surface from above along mutually oblique viewing axes lying in a common vertical plane in which lies also said sensible spot, and wherein said projection means comprises a rotary optical assembly causing said light beam to sweep angularly repeatedly substantially in said plane at a substantially uniform rate whereby said spot repeatedly travels across said surface from a point in the viewing axis of one said photocell to a point in the viewing axis of the other, and circuitry is provided that measures the interval between the occurrences of sensing of said spot by said two photocells during an individual sweep.

2. Apparatus according to claim 1, wherein said rotary optical assembly is a rotary drum assembly surrounding the light source and having one or more lenses set in its peripheral wall, the axis of rotation of the drum being perpendicular to said plane containing the photocell axes.

3. Apparatus according to claim 1, wherein the repeatedly sweeping beam is generated by said rotary optical assembly rotating about an axis parallel to the path of the beam from the light source thereto and also substantially parallel to the line bisecting the angle between the viewing axes of the photocells, the sweeping being performed by a similarly parallel beam reflected from an optical element of said rotary assembly which, during the sweeping is travelling in a short arc of its rotary path which is roughly parallel to the plane of the photocell axes.

4. Apparatus according to claim 3, wherein said rotary optical assembly comprises a central reflecting optical element reflecting the beam from the light source into a path substantially parallel to the plane of rotation, and least one further reflecting optical element rotating around said central element in planetary fashion and serving to reflect the beam into a path substantially parallel to the axis of rotation.

5. Apparatus according to claim 3, further comprising a disc rotating with said optical assembly and bearing at least one set sets of equiangularly spaced peripheral indicia which are viewed by an auxiliary photoelectric detector as they pass thereby to set up trains of regularly timed signal pulses as the disc rotates.

6. Apparatus according to claim 5, wherein said pulse trains are each gated by consecutive pulses from the two photocells indicating the beginning and end of the passage of the scanning beam over the path between the points where the two photocell viewing axes intersect the scanned surface, thereby to pass a variable portion of each pulse train containing a number of pulses indicative of the length of said path.

7. Apparatus according to claim 5, wherein the digital signal constituted by each portion of a pulse train passed as aforesaid is subjected to a digital-to-analogue conversion for read-out and level detection purposes.

8. Apparatus according to claim 1, wherein consecutive pulses from the two photocells are applied to set and reset, respectively, a bistable circuit whereby the output of the bistable circuit constitutes a switching signal that is present for a variable time period representative of the time taken for the sweeping beam to traverse the path between the points of intersection of the two photocell viewing axes with the scanned surface.

9. Apparatus according to claim 1, wherein the light source is provided with interchangeable imaging lenses to suit the nature of the swept surface.

10. Apparatus according to claim 1, wherein the rotary assembly is driven by a synchronous electric motor.

* * * * *